J. CLARK.

SPLICE BAR OR FISH PLATE FOR RAILWAY RAIL JOINTS.

No. 10,505. Reissued Aug. 5, 1884.

WITNESSES:

Fred. H. Rosenbaum.

Sidney Mann

INVENTOR

Joseph Clark

BY

Geo. H. Raegener

ATTORNEYS.

UNITED STATES PATENT OFFICE.

JOSEPH CLARK, OF BROOKLYN, NEW YORK.

SPLICE-BAR OR FISH-PLATE FOR RAILWAY-RAIL JOINTS.

SPECIFICATION forming part of Reissued Letters Patent No. 10,505, dated August 5, 1884.

Original No. 256,199, dated April 11, 1882. Application for reissue filed April 12, 1884.

DIVISION B.

*To all whom it may concern:*

Be it known that I, JOSEPH CLARK, of Brooklyn, in the county of Kings and State of New York, have invented certain new and useful Improvements in Splice-Bars for Rail-Joints; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

This invention relates to an improved splice-bar or fish-plate for railway-rail joints.

Figure 1:
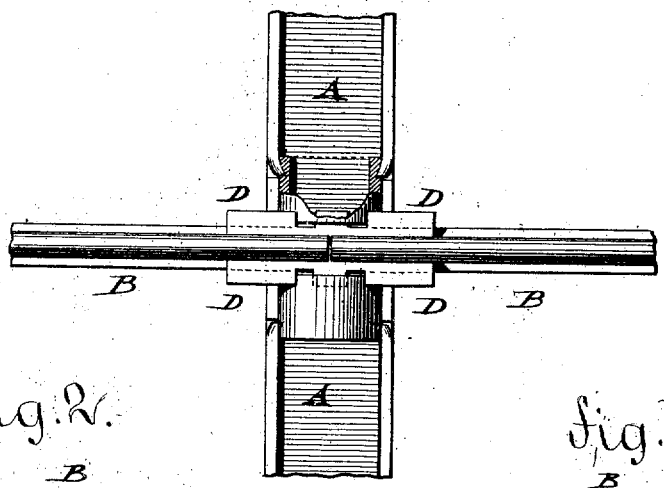
Figure 2:
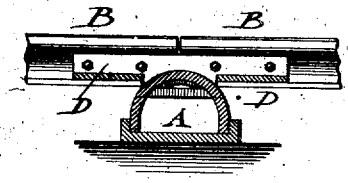
Figure 3:
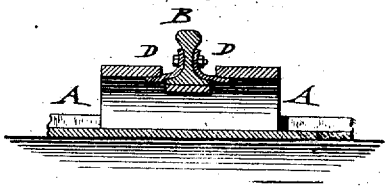
Figure 4:
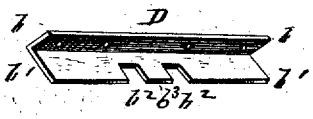

In the accompanying drawings, Figure 1 represents a plan of a railway-joint supported on a metallic tie and provided with my improved splice-bar. Fig. 2 is a side view of the joint. Fig. 3 is a vertical transverse section; Fig. 4, a perspective view of the splice-bar detached.

Similar letters of reference indicate the same parts in all the figures.

A in the drawings represents a railroad-tie, of metal, and B B the rails, which are connected at their abutting ends by splice-bars or fish-plates D D, of my improved construction. The splice-bars D are made of angular cross-section, the vertical portions $b$ extending along the web of the rails, while the lower part, $b'$, extends at an angle thereto over and beyond the base of the rails, so as to overlap the same. The lower part, $b'$, is provided at the edge with recesses $b^2$, by which the splice-bars are attached to the tie by springing the tongue $b^3$, between the recesses $b^2$, into the chair of the metallic tie, as shown in Figs. 1, 2, and 3, in which case a rigid anchoring of the splice-bar to the tie or ties is obtained. The vertical portion $b$ of the splice-bar B is bolted in the usual manner to the webs of the abutting rail ends A A. The anchoring of the splice-bars prevents the creeping of the rails over the ties, due to the expansion of the rails by heat and to the application of brakes on grades or at stations where trains run mainly in one direction.

Having thus described my invention, I claim as new and desire to secure by Letters Patent—

A splice-bar for railway-rail joints, consisting of a vertical flange adapted to fit the web of the rail and a laterally-extending flange adapted to overlap the base of the rail, said laterally-extending flange being provided at its outer edge with recesses forming an intermediate tongue, substantially as described.

In testimony whereof I have affixed my signature in presence of two witnesses.

JOSEPH CLARK.

Witnesses:
LOUIS C. RAEGENER.
SIDNEY MANN.